US008976495B2

(12) United States Patent
Boll et al.

(10) Patent No.: US 8,976,495 B2
(45) Date of Patent: Mar. 10, 2015

(54) SAFETY RELAY AND SAFETY-RELATED COMMUNICATION SYSTEM

(75) Inventors: Wolfgang Boll, Hameln (DE); Markus Eilers, Bad Pyrmont (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 368 days.

(21) Appl. No.: 13/414,961

(22) Filed: Mar. 8, 2012

(65) Prior Publication Data
US 2012/0229938 A1 Sep. 13, 2012

(30) Foreign Application Priority Data

Mar. 11, 2011 (DE) .......................... 10 2011 013 720

(51) Int. Cl.
H02H 3/12 (2006.01)
H01H 47/00 (2006.01)
H02H 3/16 (2006.01)
(52) U.S. Cl.
CPC ............... *H01H 47/002* (2013.01); *H02H 3/12* (2013.01); *H02H 3/16* (2013.01)
USPC .......................................... 361/42; 361/93.1
(58) Field of Classification Search
CPC .......... H01H 47/002; H02H 3/12; H02H 3/16
USPC .................................................. 361/160, 93.7
See application file for complete search history.

(56) References Cited

U.S. PATENT DOCUMENTS

| 4,639,719 | A  | * | 1/1987  | Pappano et al. ............... 340/652 |
| 4,825,329 | A  | * | 4/1989  | Turner ......................... 361/102 |
| 5,076,763 | A  | * | 12/1991 | Anastos et al. ............. 417/44.11 |
| 5,835,322 | A  | * | 11/1998 | Smith et al. .................... 361/45 |
| 6,567,256 | B1 | * | 5/2003  | Schweitzer, III ............. 361/185 |
| 6,657,837 | B1 | * | 12/2003 | Morris et al. .................... 361/72 |
| 6,744,260 | B2 | * | 6/2004  | Schmalz et al. ............... 324/555 |
| 8,154,835 | B2 | * | 4/2012  | Di Maio et al. ................. 361/62 |
| 8,547,126 | B2 | * | 10/2013 | Ostrovsky et al. .......... 324/750.3 |

FOREIGN PATENT DOCUMENTS

| DE | 202009007866 U1 | 7/2010 |
| EP | 2079141 A1 | 7/2009 |
| EP | 2149895 A1 | 2/2010 |

* cited by examiner

*Primary Examiner* — Zeev V Kitov
(74) *Attorney, Agent, or Firm* — Leydig, Voit & Mayer, Ltd.

(57) ABSTRACT

A safety-related communication system includes a safety relay with signal inputs of an input signal current circuit that connect the safety relay to a control device for monitoring the input signal circuit. The safety relay also includes at least two load outputs of a load current circuit for connecting to a load. Switching elements are connected in parallel and configured to switch the load current circuit on or off based on an activation signal at the input signal current circuit. A diagnostic device monitors faults in the load current circuit and/or the safety relay. A signaling device connected to the signal inputs provides an impedance for the input signal circuit. The impedance is tuned to the control device during a fault-free state and is detunable upon detection of a fault so as to signal the detected fault to the control device via the input signal current circuit.

11 Claims, 2 Drawing Sheets

SAFETY RELAY AND SAFETY-RELATED COMMUNICATION SYSTEM

CROSS REFERENCE TO RELATED APPLICATIONS

This application claims priority to German Patent Application No. DE 10 2011 013 720.3 filed Mar. 11, 2011, which is hereby incorporated by reference herein in its entirety.

FIELD

The present invention relates to a safety-related communication system in particular for automation technology and a safety relay to safely switch on loads.

BACKGROUND

In automation technology, actuators are often controlled by digital outputs of a control device, for example a programmable logic controller (PLC). Apart from controlling automated processes, safety-related functions are also increasingly controlled by control devices and carried out by corresponding actuators. To avert damage to people, machines and the environment, increased requirements apply to such safety-related functions with regard to their functionality, i.e. in particular with regard to the reliability and availability of the executing controllers and the activated actuators.

The digital signal outputs of a safety-related control device may have a monitoring device, with which a respective signal output current circuit can be monitored for faults in the wiring and for disturbances in the input region of a connected actuator.

In particular when operating actuators that have to be supplied with electrical energy, the signal output current circuit of the digital signal outputs of a control device is often electrically isolated from the respective load current circuit of the actuator as the digital signal outputs can in general drive only limited currents. The decoupling of the signal output current circuit and the load current circuits takes place, for example, by means of coupling relays, which, depending on an input signal provided by the respective digital signal outputs, can switch at least one load current circuit. The switching elements or the relay contacts in the load current circuit of the coupling relay can be configured both as a break-contact element and in the form of a make-contact element, so an inverting or non-inverting switching function can be realised with the coupling relay.

The corresponding coupling relays that meet the requirements for operation on a safety-related control device are known as safety relays. Depending on the safety requirement, a safety relay suitable for safely switching on an actuator comprises up to three switching elements connected in parallel. The switching elements are redundantly activated by a control logic of the safety relay depending on an input signal provided by the digital signal outputs of the control device so the load current circuit can be redundantly switched on by means of the switching elements.

A substantial drawback in the decoupling between the signal output current circuit and the load current circuit by a safety relay is that the monitoring device of a safety-related control device can only monitor the input current circuit of the safety relay. Possible faults in the load current circuit, for example wiring faults and faults within the safety relay, for example in the form of a failure of the internal control logic or individual switching elements, however, cannot be detected by the monitoring device of the digital signal outputs of a safety-related control device.

SUMMARY

In an embodiment, the present invention provides a safety-related communication system including a safety relay with at least two signal inputs of an input signal current circuit connecting the safety relay to a control device that is configured to monitor the input signal current circuit. The safety relay also includes at least two load outputs of a load current circuit that are configured to connect to a load. Activatable switching elements are connected in parallel and configured to switch the load current circuit on or off based on an activation signal at the input signal current circuit. A diagnostic device monitors faults in the load current circuit and/or the safety relay. A signaling device connected to the signal inputs is configured to provide an impedance for the input signal current circuit and tune the impedance to the control device during a fault-free state. The impedance is detunable upon detection of a fault so as to signal the detected fault, by the detuned impedance, to the control device via the input signal current circuit.

BRIEF DESCRIPTION OF THE DRAWINGS

Exemplary embodiments of the present invention are described in more detail below with reference to the accompanying drawings, in which.

DETAILED DESCRIPTION

Figure 1:
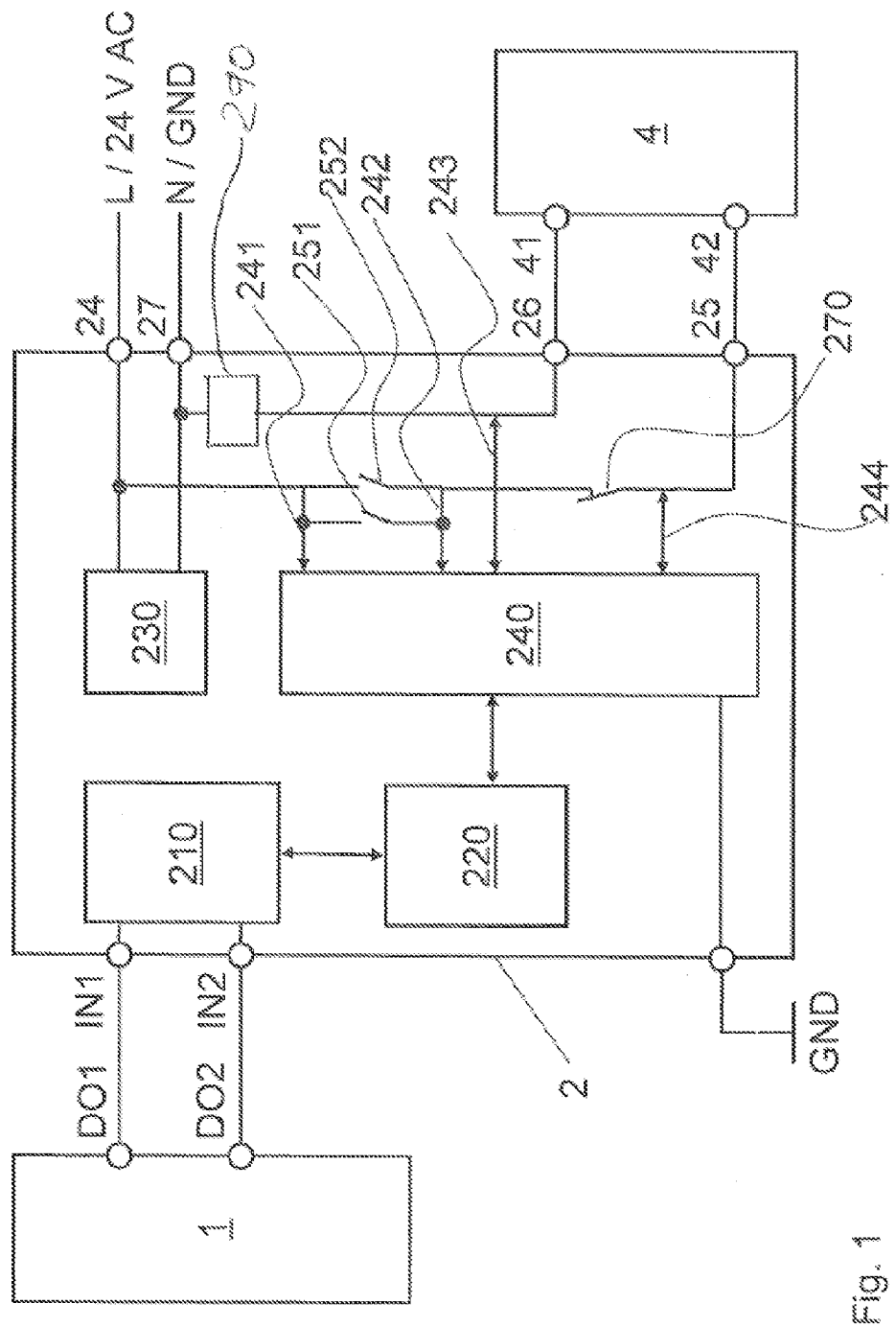
FIG. 1 shows a control device with a load that can be activated by a safety relay and with a signaling device in the safety relay to signal a fault in the load current circuit.

In an embodiment, the present invention provides safety-related monitoring of the load current circuit and safety relay by the monitoring device at the digital signal output of a safety-related control device.

This is achieved by a safety-related communication system including at least one safety relay and one control device. The safety relay has at least two signal inputs, which are in each case connected to a digital signal output of the control device and therefore form the input signal current circuit of the safety relay.

A positive voltage of an activation signal, which can be switched on and off depending on the state of the control device, may, for example, be provided for the input signal current circuit at a first connection of a digital signal output. The corresponding reference potential can be provided by a second connection of the digital signal output. The first connection of the digital signal output may be equipped with an internal voltage source or at least be electrically connected to a voltage source, which is configured with sufficient current to drive the safety relay connected between the first and second connection of the digital signal output.

The control device is configured to monitor the input signal current circuit.

The input signal current circuit can be monitored by an internal monitoring device of the control device, which is allocated, for example, to the first connection of the digital signal output. The safety relay represents a specific impedance for the input signal current circuit, it being possible to programme the monitoring device to the impedance or to train?? it to the impedance. The current flowing through the input signal current circuit can thus be measured when there is a switched-on output signal and can be compared for deviations with respect to an expected value. When there is a deviation of the measured current compared to an expected value, i.e. a value based on the known impedance, the monitoring device can infer a fault in the wiring or in the input of the safety relay. The monitoring device may furthermore comprise means which also allow line monitoring when an input signal current circuit is switched off as well as earth fault monitoring. The digital signal outputs may furthermore be testable, so their functionality can, for example, be monitored with the aid of test pulses.

The safety relay furthermore comprises at least two load outputs, a diagnostic device and a signalling device. The two load outputs form a load current circuit to connect an actuator, which may be an electrical load. The load outputs are connected to the diagnostic device, which is configured to monitor faults in the load current circuit and/or in the safety relay. The signalling device is connected to the signal inputs of the safety relay.

The load current circuit can be switched by at least two activatable switching elements connected in parallel, the switching on and off of the load current circuit taking place depending on an activation signal present at the input signal current circuit.

The signalling device is configured to provide an impedance which, in the fault-free state, is tuned to the control device for the input signal current circuit. This means that, when the safety relay is in the fault-free state, the impedance corresponds to the value programmed in the control device.

When a fault is detected, the impedance of the signalling device can be detuned in such a way that the detected fault can be signalled via the input signal current circuit to the control device by the detuned impedance.

The safety-related communication system allows the control device a complete monitoring of a safety-related signal chain, which may comprise a control device, a safety relay and an actuator. A particular advantage of this system is that a fault detected in the safety relay or in the load current circuit can be signalled to the control device via the input signal current circuit present. A separate safety-related wiring to signal a fault is unnecessary.

In an embodiment of the invention, the safety relay may comprise a long-range power supply unit which obtains, from a supply voltage for the load current circuit, auxiliary energy for the signalling device, the diagnostic device and for an internal control logic of the safety relay.

No external auxiliary energy power supply unit is therefore necessary to supply the internal electronics of the safety relay. The load current circuit may, if necessary, be operated by a direct or alternating voltage, for example in the range between 20 V and 25 V, it being possible to therefore supply the internal electronics indirectly from the same source as the connected actuator.

The diagnostic device for monitoring faults in the load current circuit and/or in the safety relay may be configured to monitor a supply voltage provided for the load current circuit.

The diagnostic device may furthermore be configured to impress a measuring current in the load current circuit and to monitor the switched-off load current circuit for a line short circuit and/or a line break.

Furthermore, the safety relay may have a measuring sensor to detect the current in the load current circuit, said measuring sensor preferably being connected to the diagnostic device. The measuring sensor may be configured to monitor the switched-on load current circuit for currents that are too high and too low and/or an incorrect phase angle.

A combination of a shunt sensor and/or a Hall sensor is particularly suitable as a measuring sensor in order to cover as wide a measuring range as possible.

The diagnostic device can be configured to couple a high frequency measuring voltage between the load current circuit and an earth potential and to monitor the load current circuit for an earth fault.

Furthermore, the diagnostic device may be configured to test the switching elements connected in parallel when the load current circuit is switched off and to detect a fault depending on the test result.

The safety relay for safely switching an actuator on can be tested and therefore configured in a safety-related manner and provides complete monitoring of the line, load and an earth fault for the load current circuit.

Depending on the possible monitoring results, the diagnostic device may in each case detect a fault, which can be signalled with the aid of the detunable impedance in the signalling device to the control device.

The signalling device may comprise a network of connectable resistances and/or inductances and/or capacitances and/or a connectable earth potential.

Advantageously, this makes it possible for a detected fault in the load current circuit to be correspondingly simulated in the signalling device and therefore in the input signal current circuit. In addition to the presence of a fault in the load current circuit, it is therefore also possible to signal the type of the respective fault to the control device.

FIG. 1 shows a circuit arrangement with an actuator 4, which can be activated by a control device 1 and must be able to actively and reliably carry out a safety-related function following a corresponding safety requirement. An actuator 4 of this type, in terms of circuitry, is an electrical load with a specific impedance. In automation technology, a control device 1 is conventionally configured as a programmable logic controller (PLC), which, by way of example, has a digital signal output with the connections DO1 and DO2, by means of which a respective actuator 4 is connected in an activatable manner. The maximum possible current, which can be provided as the activation signal at the digital signal output DO1 and DO2, is not directly suitable to operate the electrical load of the actuator 4 because of the limited driver capacity of a control device 1.

The output current circuit for the activation signal from the control device 1 is electrically isolated from the load current circuit of the actuator 4 by the safety relay 2. The connections DO1 and DO2 of the digital signal output form the signal output current circuit to activate the safety relay and are in each case connected to one of the two input terminals IN1 and IN2.

The control device 1 comprises an internal monitoring device, not shown in FIG. 1, which is connected to the two connections DO1 and DO2. The monitoring device may be configured to monitor the input signal current circuit for faults in the wiring or for faults in the input region of the safety relay.

The signal inputs IN1 and IN2 are guided internally to a signalling device 210 in the safety relay 2. The signalling device 210 is reciprocally connected to the control logic 220 and provides the input signal current circuit for an impedance that can be varied by the control logic 220.

A load current circuit, which can be switched by the safety relay 2, to the adjacent actuator 4, is provided at the load outputs 25 and 26, the operating voltage for the load current circuit being provided by the voltage-carrying connection 24 for a direct or alternating voltage and the reference potential connection 27. The current path guided from the voltage-carrying connection 24 to the load output 26 can be switched on and off by at least two switching elements 251 and 252 connected in parallel. Depending on the safety requirement, three or more switching elements connected in parallel may also be provided at this point.

The reference potential connection 27 is directly connected to the load output 26 by an internal current path in the safety relay 2. The switching elements 251 and 252 connected in parallel are redundantly activated by the control logic 220 depending on an activation signal, which is received from the signalling device 210 at the input signal current circuit of the safety relay. The switching elements connected in parallel can be activated by the control logic 220 via separate channels.

The safety relay 2 contains a diagnostic device 240, which is configured to monitor the load current circuit and can, in particular, detect wiring faults and faults in the input region of the connected actuator 4. The diagnostic device 240 inter alia has a first and second diagnostic connection 243 and 244, which are in each case connected to one of the two load outputs 25 and 26.

When the switching elements 251 and 252 are open, i.e. when an actuator 4 is switched off, a measuring current can be impressed via the first and second diagnostic connection 243 and 244 in the load current circuit, which is substantially below the threshold value necessary to activate the actuator 4. With the aid of the impressed and the measured currents and voltages, the diagnostic device is enabled to detect a possible line break and/or possible short circuits in the load current circuit.

When an actuator 4 is switched on by the closed parallel switching elements 251 and 252, the current flowing through the load current circuit is detected with the aid of at least one measuring sensor 290, which is connected to the diagnostic device 240. The measuring sensor, shown in FIG. 1, may be arranged in at least one of the current paths between the connections 24 and 25 and the connections 27 and 26. In order to achieve a large measuring range for the current, a combination comprising a shunt and a Hall sensor as the measuring sensor can be considered. Using the diagnostic device 240, depending on the operating voltage present and a trained or programmed impedance of the actuator, the current through the load current circuit can be checked, so when the measured current is too high or too low or when there is a deviation of the phase angle in an alternating current-driven load, a fault can be detected in the load current circuit.

Figure 2:
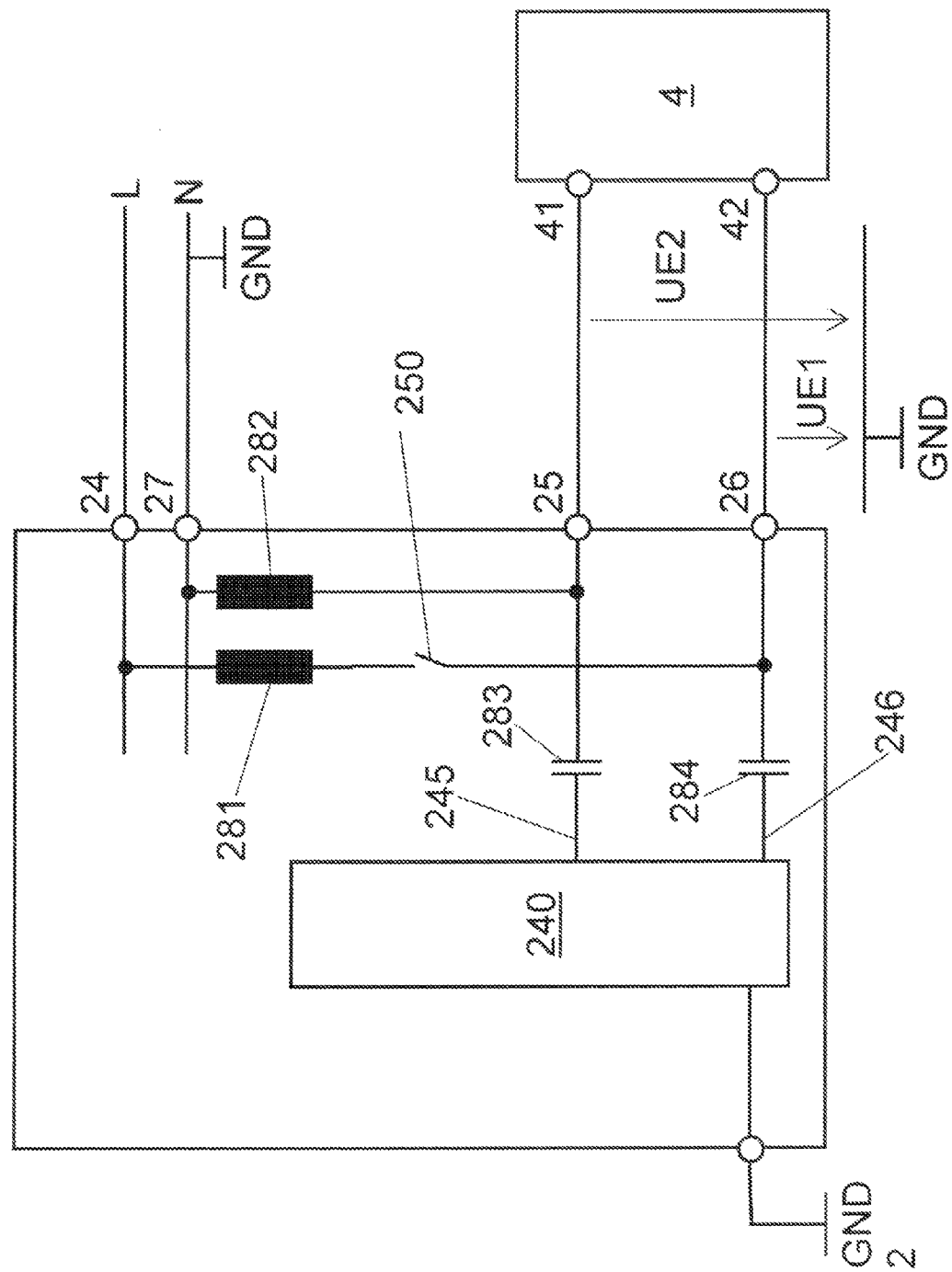
FIG. 2 shows a block diagram of an earth-fault monitoring arrangement.

The diagnostic device 240 comprises a third and a fourth diagnostic connection 245 and 246, which are used for an earth-fault monitoring shown in FIG. 2. These are connected via a respective decoupling capacitor to the load outputs 25 and 26 so a high-frequency measuring signal can be coupled into the load current circuit. The two inductances 285 and 286 in the current paths between the connections 24 and 27 and the connections 25 and 26 are used to decouple the high-frequency measuring signal relative to the operating voltage. If an earth fault occurs at one or both wiring lines of the load current circuit, i.e. between the connections 26 and 41 or 25 and 42, the current of the high-frequency measuring signal flows via the fault point and the earth connection GND of the safety relay 2 back into the diagnostic device 240.

As can also be inferred from FIG. 1, the current path, which can be switched by the parallel switching elements 251 and 252, between the voltage-carrying connection 24 and the output terminal 25, comprises an additional switchable break contact 270, which allows the at least two switching elements 251 and 252 connected in parallel to be checked with the aid of a test procedure. This test procedure may be carried out at cyclic intervals in the case of a switched-off load current circuit. At the beginning of the test procedure, the break contact 270 is firstly opened with a signal from the control logic 220. In a further step, the redundant switching elements 251 and 252 connected in parallel are activated individually one after the other by the control logic 220 and closed for a short defined time period. By means of the two diagnostic inputs 241 and 242, the voltages in front of and behind the switching elements 251 and 252 are detected by the diagnostic device 240 and it is established whether the respectively activated switching element is functional, i.e. whether it accordingly switches through with low resistance or not. After testing all the redundant switching elements, the break contact 270 is closed. The function of the closed break-contact element may then be checked, for example, by the diagnostic device 240 with the line break monitoring arrangement described above.

If the diagnostic device 240 detects a fault in the load current circuit and/or a fault in one of the redundant switching elements, this fault is signalled and communicated to the control device 1.

The communication of a detected fault takes place by means of the signalling device 210 and therefore by means of the input signal current circuit of the safety relay 2.

The signalling device 210 provides a circuit network with various impedances between the two signal inputs IN1 and IN2, which can be activated and varied in a targeted manner by the control logic 220. In the fault-free case, the impedance is tuned to the digital signal output with the connections DO1 and DO2 in such a way that the control device 1 detects an expected, i.e. a programmed or trained, impedance during the monitoring of the input signal current circuit and therefore detects a fault-free state in the input of the safety relay 2.

If the diagnostic device 240 detects a fault in the load current circuit or in the safety relay 2, the impedance of the signalling device 210 can be correspondingly detuned by the control logic 220, so a fault is also detected by the control device 1 by monitoring the input signal current circuit.

The circuit network in the signalling device 210 is able to switch the input signal current circuit with low resistance, high resistance, capacitively, inductively or to earth potential, in particular depending on a respective detected fault.

The auxiliary energy required for the control logic 220, the diagnostic device 240 and that necessary to activate the switching element 250 is obtained by means of a long-range power supply unit 230 from the operating voltage provided for the load current circuit. The long-range power supply unit 230 may, for example, be operated on the input side both with a direct voltage and with an alternating voltage between 20.4 V and 253 V and provides, for example, a 24 V direct voltage on the output side.

The circuit network in the signalling device 210 is configured in such a way that when the auxiliary voltage is not sufficient and with a control logic 220 which is therefore not ready for operation, a fault is compulsorily communicated to the control device 1. Furthermore, the diagnostic device 240 is configured to monitor the operating voltage for the load current circuit and, in the event of a deviation, to communicate a fault via the control logic 220 and the signalling device 210 to the control device 1.

Owing to the variable impedance in the signalling device 210, faults detected by the diagnostic device 240 in the load current circuit can be correspondingly simulated at the input signal current circuit of the safety relay 2. The control device 1, during the monitoring of the input signal current circuit, therefore also detects a corresponding fault via the two connections of the digital signal output DO1 and DO2.

Using the signalling device 210, a communication system for the control device 1 and the safety relay 2 is provided, which allows a safety-related, bidirectional communication between these two stations. The safety relay 2 including the load current circuit with an actuator 4 is completely testable by the control device 1, so faults both in the load current circuit, including the associated operating voltage, and also within the safety relay 2, can be detected. In the case of a fault, the control device 1 adopts a safe state.

While the invention has been particularly shown and described with reference to preferred embodiments thereof, it will be understood by those skilled in the art that various changes in form and details may be made therein without departing from the spirit and scope of the invention.

What is claimed is:

1. A safety-related communication system comprising:
    a control device being configured to deliver digital activation and deactivation signals for controlling a load through an input signal current circuit and configured to discriminate between a fault-free state impedance and different fault state impedances detectable through the input signal current circuit; and
    a safety relay for connecting a power supply voltage to the load under the control of the control device, the safety relay including:
        at least two signal inputs of the input signal current circuit connecting the safety relay to the control device;
        at least two load outputs of a load current circuit configured to connect the power supply voltage to the load,
        at least two activatable switching elements connected in parallel and configured to switch the load current circuit on or off based on an activation signal at the input signal current circuit;
        a diagnostic device configured to detect different faults in at least one of the load current circuit and the safety relay and to produce a fault state signal with respect to a detected fault; and
        a signaling device connected via a control logic to the diagnostic device for receiving a control signal indicating a fault-free state or a control signal indicating a fault state from the control logic and for providing the fault-free state impedance or the fault state impedance with respect to the detected fault at the input signal current circuit for being monitored by the control device and signaling any detected fault.

2. The safety-related communication system recited in claim 1, wherein the safety relay includes a long-range power supply unit configured to receive auxiliary energy for the signaling device, the diagnostic device and an internal control logic of the safety relay from the power supply voltage of the load current circuit.

3. The safety-related communication system recited in claim 1, wherein the diagnostic device is configured to monitor the power supply voltage of the load current circuit and detect a fault state when the power supply voltage is not sufficiently high.

4. The safety related communication system recited in claim 1, wherein the diagnostic device is configured to impress a measuring current in the load current circuit and monitor the load current circuit when switched off for at least one of a line short and a line break, and to detect a fault state based on result of the monitoring.

5. The safety-related communication system recited in claim 1, wherein the safety relay includes a measuring sensor connected to the diagnostic device, the measuring sensor being configured to detect current in the load current circuit, to monitor the load current circuit when switched on for currents that are too high, currents that are too low, and incorrect phase angles, and to detect a fault state based on a result of the monitoring.

6. The safety-related communication system recited in claim 5, wherein the measuring sensor includes at least one of a shunt sensor and a Hall sensor.

7. The safety-related communication system recited in claim 1, wherein the power supply voltage is relative to earth potential, and the diagnostic device is configured to couple a high frequency measuring voltage between the load current circuit and the earth potential, and to detect a fault state based on a result of the monitoring.

8. The safety-related communication system recited in claim 1, wherein the diagnostic device is configured to test the activatable switching elements when the load current circuit is switched off, and to detect a fault state based on a result of the test.

9. The safety-related communication system recited in claim 1, wherein the signaling device includes a network of devices including at least one of a resistance, an inductance, a capacitance and a connectable earth potential.

10. A safety relay comprising:
    at least two signal inputs of an input signal current circuit configured to connect to a control device, the control device being configured to deliver digital activation and deactivation signals and to monitor the input signal current circuit for a condition of fault-free state impedance and different fault state impedances of the input signal current circuit;
    at least two load outputs of a load current circuit configured to connect a power supply voltage to a load;
    redundantly activatable switching elements connected in parallel and configured to switch the load current circuit on or off based on an activation signal at the input signal current circuit;
    a diagnostic device configured to detect different faults in at least one of the load current circuit and the safety relay; and
    a signaling device connected via a control logic to the diagnostic device for receiving a control signal indicating at least one of a fault-free state or a control signal indicating a fault state from the control logic and for providing a fault-free state impedance or a fault state impedance with respect to the detected fault at the input signal current circuit for being monitored by the control device and signaling the detected fault.

11. The safety relay recited in claim 10, wherein the signaling device includes a network of devices including at least one of a resistance, an inductance, a capacitance and a connectable earth potential.

* * * * *